United States Patent Office 3,472,629
Patented Oct. 14, 1969

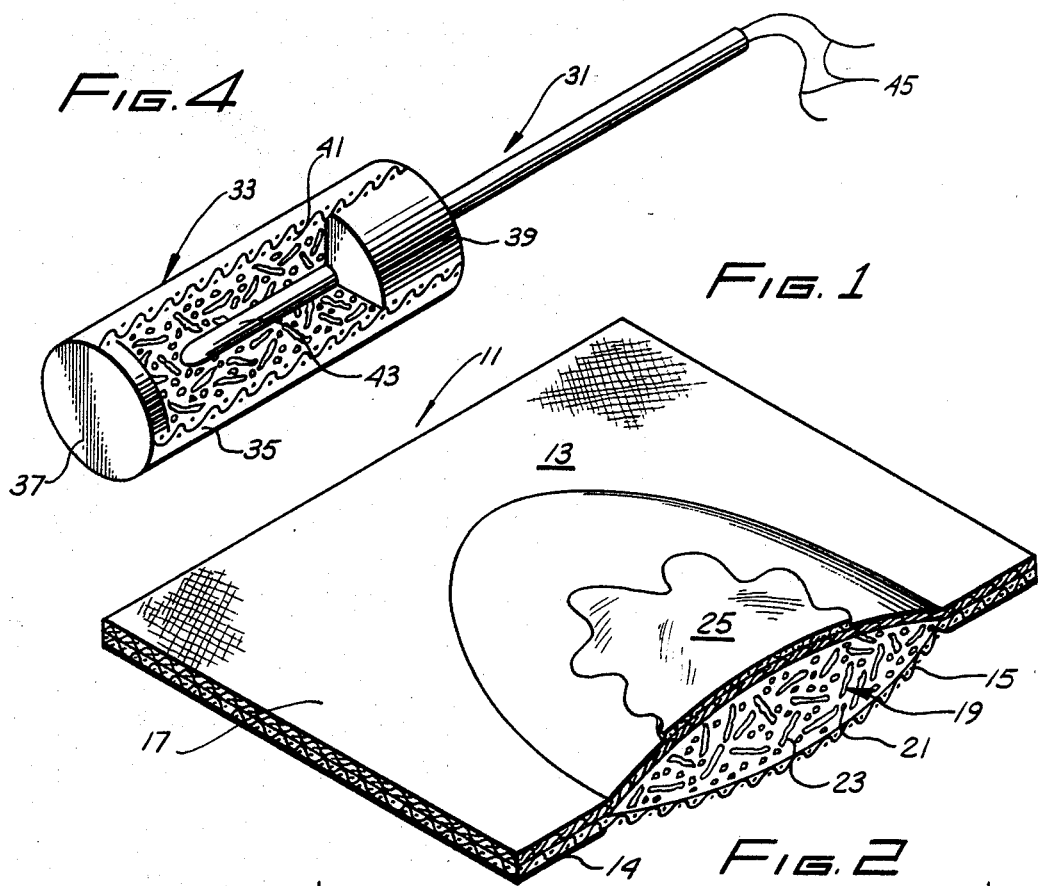
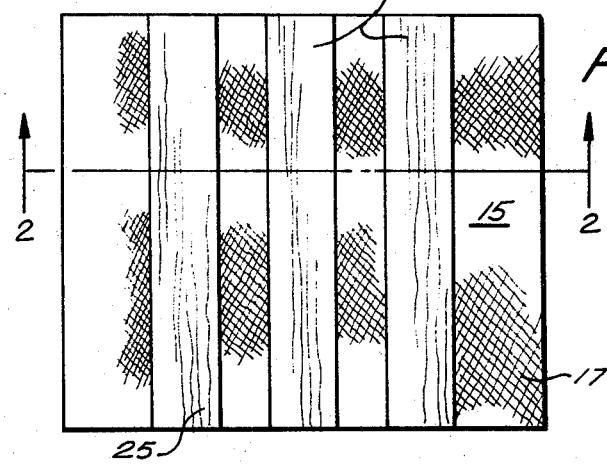

3,472,629
HYDROGEN LEAK DETECTION DEVICE
Marjorie A. Rommel, Chatsworth, and Victor H. Dayan, Canoga Park, Calif., assignors, by mesne assignments, to the United States of America as represented by the National Aeronautics and Space Administration
Continuation-in-part of application Ser. No. 593,416, Nov. 10, 1966. This applicaion May 8, 1967, Ser. No. 636,878
Int. Cl. G01n *31/10*
U.S. Cl. 23—254        9 Claims

ABSTRACT OF THE DISCLOSURE

This invention relates to a device for the reliable detection of free hydrogen in ambient environments. The device comprises a porous body containing a catalytic metal that heats upon contact with gaseous hydrogen, a reaction inhibiting agent, and a sensing means for detecting changes in temperature of the metal-inhibiting agent mixture.

The invention described herein was made in the performance of work under a NASA contract and is subject to the provisions of the National Aeronautics and Space Act of 1958, Public Law 85–568 (72 Stat. 426; 42 U.S.C. 2451), as amended.

CROSS-REFERENCE TO RELATED APPLICATIONS

This is a continuation in part of application Ser. No. 593,416 filed Nov. 10, 1966, now abandoned.

Prior art

In industries where hydrogen in both the liquid and gaseous state occurs extensively, the need exists for the rapid determination of any leaks in lines or vessels containing hydrogen, as such leaks are potential explosion or fire hazards. This hydrogen detection is useful, for instance, in hydrogen laboratories, reactors, cryogenics laboratories, hydrogen production facilities, petrochemical operations, coal hydrogenation, electrochemical plating operations, chemical etching operations, carbon monoxide production, fuel cells, metal coolants, environmental control systems, the aerospace industry and other applications. Prior to the herein invention, the detection of hydrogen was often accomplished by complicated gas analyzing devices. Such devices were often complex and cumbersome and could not readily be moved in field facilities to varying locations. To detect gaseous leaks, it was necessary that the detection device or the gas analyzer be disposed relatively close to where the leak was occurring. Otherwise, it is apparent that dissipation of gas into the atmosphere would prevent adequate detection. Such gas analyzing devices are relatively expensive. Thus, the cost of disposing a large number of such devices about a complex facility utilizing hydrogen would be prohibitive. Additionally, there was no means available whereby personnel working in areas where hydrogen gas was used could detect whether or not their person was in an atmosphere containing the gas. In other words, the gas analyzing devices were not generally mobile.

Thus, an object of this invention is to provide a simple nonmechanical device and method for the detection of hydrogen leaks.

Further, an object of this invention is to provide a simple device and method for the detection of hydrogen leaks which can be worn on the person.

Still another object of this invention is to provide a method and device for the detection of hydrogen leaks which can be disposed adjacent to apparatus utilizing or carrying hydrogen.

SUMMARY OF THE INVENTION

The above and other objects are accomplished by the device of this invention which comprises a porous container, such as fiber glass or screen, containing a catalytic metal that heats upon contact with hydrogen mixed with a thermally activated reaction inhibiter. Means for sensing temperature rise are associated with the metal-inhibiter mixture. An example of such means would be a partial coating of thermochromic paint on the outer surface of the porous container. The metal reacts with gaseous hydrogen, which will pass through the porous body, giving off heat. The heat causes the temperature sensing means to indicate a rise in temperature, and hence to indicate the presence of hydrogen. The thermally activated reaction inhibitor can then act upon the metal, limiting the temperature rise to a safe range. Devices have been constructed which will detect down to one and one-half percent hydrogen and as small a flow as 50 milliliters per minute.

The enclosure for the metal-inhibiter mixture is preferably a very fine mesh, for example, 800 mesh, and can be made of stainless steel, fibreglass fabric, or other non-reactive permeable material. Obviously, the permeable material should be of such a mesh so as to prohibit the passage of the metal-inhibiter mixture therethrough, yet admit the hydrogen into the enclosed area. Fibreglass fabrics have been found to be especially satisfactory when used either as the entire enclosure or as the porous part of an otherwise impermeable enclosure. For instance, a preferred embodiment of the instant invention is a packet comprising a fibreglass fabric face and an essentially impermeable backing.

The catalytic metal reacts with the hydrogen to be detected to produce heat. Its functional requirement, then, is that it be capable of catalytically reacting with hydrogen to produce heat. Such metals as rhodium, palladium, platinum, uranium, and the lanthanide rare earths are suitable. For cost reasons, uranium, palladium, cerium, and commercially available mixtures of lanthanide rare earths are preferred catalysts. Palladium black is the single preferred catalytic metal. While not wishing to be bound by theory, it is thought that the heat is the result of a two-step reaction. First, the combination of hydrogen with the metal to form either atomic hydrogen or a metal hydride, and second, the almost instantaneous reaction of oxygen with the atomic hydrogen or metallic hydride to produce water and more heat, regenerating the metal. Since this is a surface reaction, the reaction rate, and hence, heat produced per unit time is increased as the surface area of the metal per unit weight is increased. It is for this reason that it is preferred that the metal be in the form of a finely divided powder. However, it is recognized that a form having less surface area per unit weight would heat, albeit to a lesser degree, and might prove serviceable under particular conditions, e.g., rapid flooding with extremely high concentrations of hydrogen.

The thermally activated inhibiting agent is a critical part of this invention. Its function is to prevent the catalytic metal from achieving too high a temperature and actually igniting the hydrogen that is to be detected. This becomes a very real problem where the hydrogen leaks that can be expected will produce a concentration in air of hydrogen greater than 4 percent by volume, as above this level hydrogen/oxygen mixtures are combustible. Prior art hydrogen detection devices employing, for example, palladium black have not employed this inhibiting feature and, hence, were not suitable under conditions in which they could act as an igniter rather than as a detector. An example of such a prior art detection device is described in U.S. Patent No. 1,467,911, issued to M. Arendt, et al., on Sept. 11, 1923. If this device were to be placed in a hydrogen/oxygen mixture of explosive compositions, the heating of the palladium member could cause ignition of the surrounding combustible atmosphere.

It must, of course, be appreciated that the hydrogen detection devices of the instant invention do have the disadvantage of not being reuseable once the inhibiting agent has acted upon the catalytic metal. However, since the devices of the instant invention can be made for prices which render them disposable, this is of little concern. It is recognized that in some embodiments employing a large amount of metal, it could be economically feasible to regenerate the deactivated catalytic metal.

It should be appreciated that since the inhibiting agent is triggered by a raise in temperature above a certain point, the device is suitable for repetitive quantitative detection of concentrations of hydrogen, provided that the concentrations are sufficiently small such that they do not heat the metal beyond the point required to trigger the inhibiting agent. If a thermal sensing device such as a thermocouple is used in this embodiment, these low concentrations would be quantitatively measureable. Of course, once the inhibiting agent has reacted, the detection device is qualitative and merely indicates the past or present presence of high concentrations of hydrogen.

The inhibiting agent can either chemically react with the metal, stopping the aforementioned catalytic reaction, or physically smother the metal by melting, by vaporizing, or by decomposing to form vapor and/or melt, which again stops the reaction. Examples of suitable inhibiting agents are carnauba wax, sulphur and urea. Urea has been found to be especially suitable. The particular inhibiting agent selected is not critical. Its function is. It must completely deactivate the catalytic metal at a temperature below that at which the metal would ignite a hydrogen/oxygen mixture. The speed of deactivation must, therefore, be taken into account when determining the temperature at which the inhibiting agent acts upon the metal. If the inhibiting agent acts relatively quickly upon the palladium, it may be of such a composition so as to be triggered at higher temperatures. On the other hand, if it acts relatively slowly, it should begin to act at temperatures far below those at which palladium ignites hydrogen/oxygen mixtures. For example, wax, which melts over a relatively broad temperature range, should be of such a composition as to commerce its melting and hence deactivation, at a temperature of about 90° C. On the other hand, urea melts at about 132° C. and subsequently undergoes an endothermic reaction to produce ammonia and biuret. The biuret continues to smother the metal, as did the molten urea. Urea is, therefore, a suitable deactivation agent, although it does not start to act until it reaches a temperature of about 132° C. Its action on the metal is thereafter relatively rapid. It is envisioned that the reaction inhibiting agent may commence its action as high as 500° C. and as low as 40° C. The preferred range of thermal activation of the deactivation agent is from about 90° C. to about 200° C. In the case of detection devices disposed on hydrogen lines which become frost shrouded in operation, it has been found advisable to design the device such that sufficient temperature is generated by their activation that any frost on the detection device is melted by the heating of the metal.

The thermal sensing means may be of many types known in the art. For instance, thermocouples imbedded in or placed adjacent to the metal-inhibiter mixture will detect temperature changes and generate proportionate EMF's. These EMF's may be used to determine quantitatively the amount of hydrogen present, assuming the inhibiter has not been triggered, or may be used to qualitatively determine the presence of hydrogen in any instance. These thermocouples can be in the form of thermopiles. An example of a suitable thermopile is disclosed in U.S. Patent No. 2,807,657, issued Sept. 24, 1957. Similarly, solid state devices, such as transistors, may be imbedded in the metal-inhibiter mixture in such a circuit as to produce an indication of a temperature rise about the device. EMF's generated by heat in certain semiconductor materials may generate audio signals when used in conjunction with metal-inhibiter mixtures to detect hydrogen.

For more inexpensive embodiments of the invention, particularly those that are desired to be portable and disposable, thermochromic paints have been found to be desirable. In this embodiment, the enclosure containing the metal-inhibiter mixture is partially painted with a thermochromic paint that will undergo a change in color at some temperature below that which is the upper temperature limit of the device, as determined by the inhibiter. The thermochromic paint can be Hardman Detecto Temp 915–0923, a tradename for a product of H. V. Hardman Co., Inc., for example. This material exhibits a change in color at 55° C. and again changes color at 85° C. Other thermochromic paints such as Hardman 915–0900, Hardman 915–0901, and Hardman 915–0902, are also suitable. For some applications, these paints can be protected from the elements by a moisture impervious coating. U.S. Patent 2,261,473, issued Nov. 4, 1941, shows a specific class of thermochromic paints. It must be appreciated that a certain amount of selectivity on the part of the practitioner as to the proper paint or indeed as to the type of thermal sensing means is permissible within the scope of this invention. An alternative to the use of thermochromic paint would be the use of "liquid crystals" such as cholesteric esters and mixtures. These liquid crystals can also be so formulated as to go through definite color changes with temperature and may, in some applications where great sensitivity is required, be preferable to thermochromic paint.

It is believed that the invention will be better understood by the following detailed description and drawings in which:

FIG. 1 is a perspective view of a sectioned embodiment of this invention.

FIG. 2 is a cross-sectional view of an embodiment of this invention.

FIG. 3 is a top view of the device of FIG. 2.

FIG. 4 is a pictorial view of a second embodiment of this invention utilizing a thermocouple for determining the rise in temperature.

Referring now to FIG. 1, there is shown a perspective view of the hydrogen detection device 11 of the invention. The device is comprised of a packet formed of a flexible backing 13 and a flexible porous substance 15. About the periphery 17 where the two faces are joined, a seal can be effected by crimping of the material or other means known in the art. In the center portion a pocket 19 is formed where the bottom portion 13 is separated from the top porous substance 15. The pocket 19 serves to contain the catalytic metal material 21 which is depicted as spherical granules in the drawing. The pocket 19 additionally contains granules 23 of a reaction stopping material such as urea, which is depicted as having elongated granular shape. A spot 25 of, for instance, thermochromic paint is disposed on the outer surface of the backing 13. In practice, it has been found that high ambient temperatures can cause the paint 25 to change color in the absence of hydrogen. To detect such an erroneous indication, the paint can be disposed on the entire surface 13 so that ambient temperature rises change all of the paint, while hydrogen will only cause that over the pocket 19 to change. Adhesive material 14 is disposed on the top surface of the packet. In operation, the packet is affixed by the adhesive 14 to a joint at which a hydrogen leak can occur. Its flexible character allows it to be disposed about a pipe, for instance. If a leak does occur, it will cause hydrogen to pass through the porous material 15. The hydrogen will then react with the metal 21, which will heat, producing a color change in the thermochromic paint 25. If the temperature rises above a predetermined point, the inhibiter 23 acts upon the metal 21, preventing overheating of the packet.

FIG. 2 illustrates another embodiment of the invention. In this embodiment, both the top surface 15 and the surface 16 are porous, and no adhesive is disposed on the packet. This packet would be suitable, for instance, as a badge to be worn by personnel. Other uses of this configuration will be apparent to those skilled in the art. FIG. 3 illustrates a top view of the device of FIG. 2. It will be noted that the thermochromic paint 25 is disposed on the porous surface 15 in such a fashion as to permit ingress of hydrogen to the packet.

Turning now to FIG. 4, there is shown yet another embodiment of the invention which utilizes a thermocouple to provide for a remote and fairly accurate determination of the amount of hydrogen present in an atmosphere. When a thermocouple is utilized, the device can provide a sufficient signal to operate a variety of warning devices. Also the thermocouple could be utilized to activate automated venting or purging systems to dissipate the accumulative hydrogen or activate cutoff systems for emergency shutdown of operations, eliminating potential ignition sources.

In FIG. 4, there is shown a hydrogen detection device 31, which comprises a cylindrically shaped main body 33 formed of a fine mesh screen 35 of the same function as that that has been previously described with regard to the embodiment of FIG. 1. The screen is fastened at its uppermost end to a disc 37 which can be of a material such as 347 stainless steel or other metallic material by welding or other suitable means. The opposite end of the cylindrical screen is affixed to a disc 39 of a material such as Teflon, which allows easy insertion and withdrawal of the thermocouple. Within the cylinder is disposed the metal-inhibitor mixture 41. Extending through the nonconductive disc 39 into the palladium black-inhibitor mixture is a conventional temperature probe element 43, which passes through the disc 39 to outside the body. Electrical leads 45 connected to the probe 43 will lead to a conventional Wheatstone bridge circuit or the like where the temperature within the palladium black can be determined on a calibrated instrument not shown. In this embodiment, a portion of the screen may be covered with a thermochromic paint so that a visual indication of the hydrogen leak would be present in addition to the actual temperature recordation. As previously indicated, the temperature rise will produce a voltage rise in the thermocouple and probe 43. The signal from the thermocouple can be read quantitatively on a suitably sensitive voltmeter. It has, for example, been found that the rise of the temperature of palladium black in the device now in use is proportional to the presence of hydrogen. This proportionality aids in calibrating the readout device if such is used. It should be pointed out that through the cylindrical device using Teflon at one end and stainless steel disc at the other to form the cylinder is specifically shown, this is not mandatorily required for successful operation of the device. A simple packet formed of two layers of wire screen or gauze crimped about their outer edges in a similar manner to that shown in FIG. 1 can be used with a thermocouple being inserted into the catalytic metal through one of the crimped edges.

Generally, the palladium black, the preferred metal of the instant invention, has size particles ranging downward from 0.1 micron, with packed density of about 1 gram per cubic centimeter or less. A containing screen or gauze-like material sufficient to contain the palladium black has a mesh size which ranges from 200 x 1200 meshes per linear inch "Dutch weave." This readily permits the hydrogen to enter the palladium black without losing any significant amount of the palladium black alternatively through the pores of the screen.

In determining the amount of reaction inhibiter material to be used in combination with the metal, the ratio of one material to another is empirically determined from either the amount of inhibiter necessary to adequately and completely cover the metal particle upon melting or vaporizing or the amount to completely react with the metal surface. For a given inhibiter, the amount necessary to effectuate a complete deactivation could be determined from running simple tests in which the ratio of metal to the inhibiter would be varied. One would then select the ratio where the reaction of the hydrogen with the metal would be effectively and completely stopped at a point after, for instance, the color change in the thermochromic paint yet under the point at which ignition of the hydrogen at the surface of the metal would occur. As a rule of thumb, it has been found, in the utilization of sulphur and wax, for example, that a volume ratio of about 1:1 will adequately accomplish the desired end result. In general, from 50% to 96% quenching material is serviceable. In the case of urea, a volume ratio of 1 to 3 is serviceable.

Although the invention has been described and illustrated in detail, it is to be clearly understood that the same is by way of illustration and example only and is not to be taken by way of limitation, the spirit and scope of this invention being limited only by the terms of the appended claims.

We claim:
1. A hydrogen gas detector comprising:
   a porous enclosure,
   a mixture of a catalytic metal that heats upon contact with hydrogen and an inhibiting agent which is activated by a rise in temperature caused by the heat of reaction of hydrogen with said metal, thereby melting and physically smothering the catalyst at a temperature below the ignition temperature of hydrogen, disposed within said enclosure, and
   means for detecting a temperature rise of said mixture when said metal reacts with hydrogen.
2. The device of claim 1 wherein the metal is selected from the group consisting of rhodium, palladium, platinum, uranium and the lanthanide rare earths.
3. The device of claim 1 wherein the metal is selected from the group consisting of uranium, palladium, and lanthanide rare earths.
4. The device of claim 1 wherein the metal is palladium.
5. The device of claim 1 wherein the detection means comprises thermochromic paint applied to a portion of said enclosure.
6. The device of claim 1 wherein the detection means is a thermocouple disposed within said mixture and extending from said enclosure.
7. The device of claim 1 wherein the detection means is a cholesterol ester which undergoes a distinct color change at a predetermined temperature below the ignition temperature of hydrogen.
8. The device of claim 1 wherein the inhibiting agent is urea.
9. A flexible hydrogen detection packet comprising:
   a porous side having adhesive disposed at least upon part of said side,
   an essentially impervious side having thermochromic paint disposed at least upon part of said side,
   said sides enclosing a pocket containing a mixture of palladium black and urea of such a formulation as to heat to the degree necessary to activate the thermochromic paint upon contact with hydrogen and prevent heating of said pocket to the ignition temperature of hydrogen.

(References on following page)

References Cited

UNITED STATES PATENTS

| | | | |
|---|---|---|---|
| 1,467,911 | 9/1923 | Arendt et al. | 73—26 |
| 1,924,793 | 8/1933 | Laske | 252—408 X |
| 2,254,480 | 9/1941 | Guaragna | 23—254 X |

OTHER REFERENCES

Bailey, K. C., Chemical Society Journal, 1930, p. 104.
Chemical Abstracts, vol. 26, p. 355 (1932).
Chemical Abstracts, vol. 49, p. 3601 (1955).
Chemical Abstracts, vol. 51, p. 3259 (1957).
Mellor, J. W., Comprehensive Treatise of Inorganic and Theoretical Chemistry, vol. 15, pp. 561–562 (1936).
Mulford, R. N. et al., Journal of Physical Chemistry, vol. 59, pp. 1222–26 (1955).

JOSEPH SCOVRONEK, Primary Examiner

ELLIOTT A. KATZ, Assistant Examiner

U.S. Cl. X.R.

73—25, 343, 356, 359; 116—114.5; 252—408